No. 622,287. Patented Apr. 4, 1899.
E. A. STEPHENSON.
COMBINED CORN HUSKER AND FODDER SHREDDER.
(Application filed Sept. 20, 1898.)

(No Model.) 10 Sheets—Sheet 1.

Fig. 1.

Witnesses:
Inventor:
Emery A. Stephenson,
by H. B. Willson & Co.
Attorneys.

No. 622,287. Patented Apr. 4, 1899.
E. A. STEPHENSON.
COMBINED CORN HUSKER AND FODDER SHREDDER.
(Application filed Sept. 20, 1898.)
(No Model.) 10 Sheets—Sheet 3.

Witnesses:
Fenton N Belt,
J H Willston

Inventor:
Emery A Stephenson,
by H B Willson & Co
Attorneys.

No. 622,287. Patented Apr. 4, 1899.
E. A. STEPHENSON.
COMBINED CORN HUSKER AND FODDER SHREDDER.
(Application filed Sept. 20, 1898.)
(No Model.) 10 Sheets—Sheet 5.

Witnesses:
Fenton S. Belt,
J. A. Miller

Inventor:
Emery A Stephenson,
by H. B. Willson & Co.
Attorneys.

No. 622,287. Patented Apr. 4, 1899.
E. A. STEPHENSON.
COMBINED CORN HUSKER AND FODDER SHREDDER.
(Application filed Sept. 20, 1898.)
(No Model.) 10 Sheets—Sheet 8.

Witnesses:

Inventor:
Emery A Stephenson,
by H. B. Willson & Co
Attorneys.

No. 622,287. Patented Apr. 4, 1899.
E. A. STEPHENSON.
COMBINED CORN HUSKER AND FODDER SHREDDER.
(Application filed Sept. 20, 1898.)
(No Model.) 10 Sheets—Sheet 9.

Witnesses:

Inventor:
Emery A Stephenson,
by H. B. Willson & Co.
Attorneys

No. 622,287. Patented Apr. 4, 1899.
E. A. STEPHENSON.
COMBINED CORN HUSKER AND FODDER SHREDDER.
(Application filed Sept. 20, 1898.)
(No Model.) 10 Sheets—Sheet 10.

Witnesses: Inventor: Emery A Stephenson,
by H. B. Willson & Co.
Attorneys.

UNITED STATES PATENT OFFICE.

EMERY A. STEPHENSON, OF WAUGH, INDIANA.

COMBINED CORN-HUSKER AND FODDER-SHREDDER.

SPECIFICATION forming part of Letters Patent No. 622,287, dated April 4, 1899.

Application filed September 20, 1898. Serial No. 691,462. (No model.)

*To all whom it may concern:*

Be it known that I, EMERY A. STEPHENSON, a citizen of the United States, residing at Waugh, in the county of Boone and State of Indiana, have invented certain new and useful Improvements in a Combined Corn-Husker and Fodder-Shredder; and I do declare the following to be a full, clear, and exact description of the invention, such as will enable other skilled in the art to which it appertains to make and use the same.

My invention relates to a combined self-feeding corn-husker and fodder-shredder; and the object is to provide a simple, practical, and effective machine of this character for automatically husking the corn and shredding the fodder in a rapid, effective, and economical manner.

To these ends the invention consists in the construction, combination, and arrangement of the several parts of the machine, as will be hereinafter more fully described, and particularly pointed out in detail.

The accompanying drawings show my invention in the best form now known to me; but many changes in the details might be made, within the skill of a good mechanic, without departing from the spirit of my invention, as set forth in the claims at the end of this specification.

The same reference characters indicate the same parts of the machine.

Fig. 15 is a detail view of the husking-roller bearings.

The main portion of the frame consists of the inclined sills 1 1, which extend upwardly from the rear axle to the standards 2 3 and 2' 3', fixed to the front bolster 4, to which the front axle 5 is pivoted. The forward ends of these sills are connected by a cross-brace 6, from which two vertical braces 7 7 extend to the bolster 4 and between which the fodder-carrier 8 extends, its lower end being pivoted on a shaft 9, fixed in the standards 2 2. This carrier is formed of folding sections hinged together and when extended is supported by the guy-ropes 10 10, which extend inwardly to the windlass-shaft 12, journaled in the upper ends of the standards 13 13. The carrier is provided with the usual endless carrier-belt 14, and it is driven by a roller 15, fixed on a shaft 16, journaled in its lower end and provided with a band-pulley 17. A similar, though smaller, carrier 18 is pivoted to the rear end of the frame, and it is supported in position by a single brace-rod 19, and its outer end is elevated to such a height that the corn which it carries will be discharged or delivered into a wagon placed there to receive it. It is provided with a slatted carrier-belt, which is driven by the pulley 20.

21 denotes a sliding pan placed under the riddle 21' to receive the shelled corn, and the forward end of this riddle is mounted on a drop-crank rock-shaft 22, one end of which is provided with a vertical arm 23, from the upper end of which a rod 24 extends to a disk-wheel 25, fixed on the shaft 26, the opposite end of which is provided with a pulley 27 to give the proper vibratory movement to the riddle. Immediately above the riddle is an inclined shuck-carrier 28, which is suitably orificed, as shown, to permit the loose grains of corn to pass through and fall upon the riddle.

29 represents a blast-fan driven by the pulley 30 to blow the chaff and refuse matter from the grain as it falls upon the riddle.

31 denotes a slatted conveyer-belt which travels upwardly across the face of the shuck-carrier 28 to deliver the shucks to the shredding-saws 32, which are fixed on the main driving-shaft 33, driven by the pulley 34.

Figure 8:
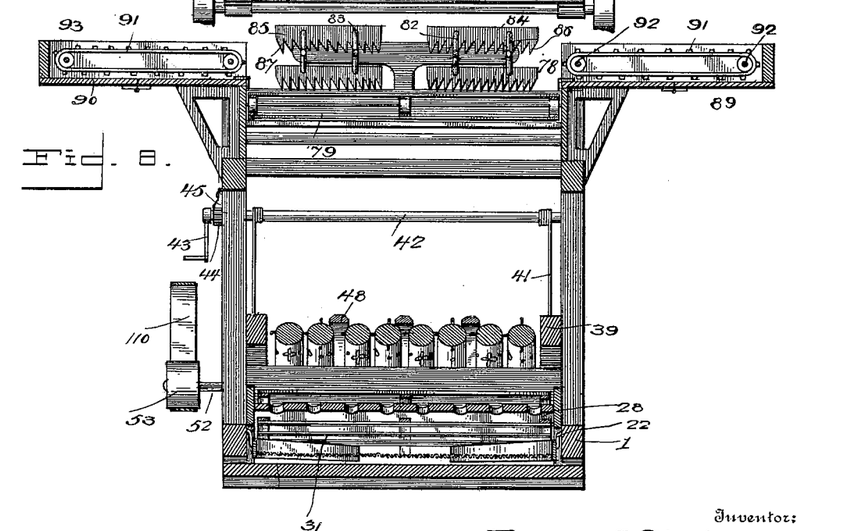
Fig. 8 is a similar view on the line 7 7 of Fig. 2.
Figures 9, 10:
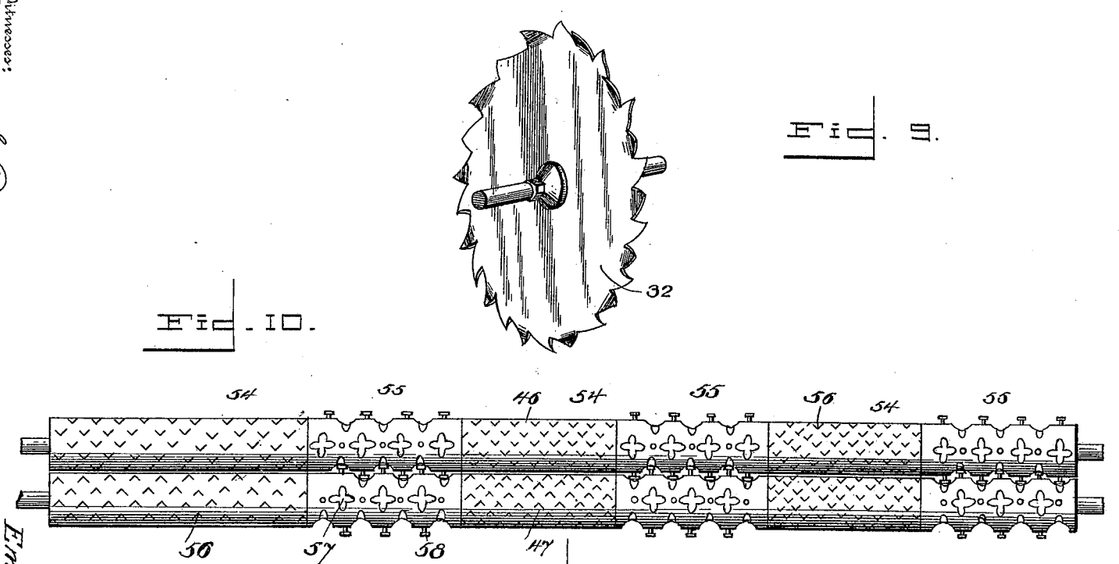
Fig. 9 is a detail view of one of the shredder-saws.
Fig. 10 is a similar view of a pair of the husking-rollers.

35 denotes a concave pan or trough located beneath the shredder-saws, and it consists of a series of transverse parallel bars arranged in a semicircle concentric with the shredder-saws, and each bar is provided with a series of serrated studs or teeth 36, which project radially between the saws and serve to retard the movement of the shucks, so that the saws will effectually disintegrate them. The teeth of these shredder-saws are turned in opposite directions, as shown in Fig. 8, to more effectually perform their work, and when the shucks or husks are thoroughly shredded they fall from the trough 35 upon the carrier 8, where they are delivered to the mow. Immediately above the shuck-carrier 28 and approximately parallel therewith is ranged a series of husking-rollers which are journaled in the end pieces 37 38 of the rectangular frame 39, the upper end of which is journaled in the bearings 40, while its lower end is supported by two wire-cords 41 41, the upper ends of which are fixed to a shaft 42, provided with a crank-handle 43 and ratchet-wheel 44 to engage the pawl 45, so that this end of the frame may be raised or lowered to secure the best results. These husking-rollers 46 47 are arranged in pairs, (shown in detail in Fig. 10,) and each pair is geared to turn inwardly toward each other, and between each pair of rollers is a fixed longitudinal shield or strip 48 to divide the ears and prevent their being caught between the contiguous rollers of each pair. The lower ends of these husking-rollers are formed with journals 49, which have a bearing in the lower end piece 37 of the frame 39, and their projecting ends carry a series of bevel-gears 50, which mesh with a corresponding series of bevel-gears 51, fixed on the shaft 52, driven by the band-pulley 53. These husking-rollers 46 47 are of novel formation, being constructed of alternating cylindrical sections 54 and 55, the corresponding sections on each roller being arranged in the same plane, the sections 54 being formed with projecting V-shaped picker-teeth 56, while the intermediate sections 55 are formed with a series of cross-shaped recesses 57, alternating longitudinally and circumferentially with a series of screw-headed studs 58, so arranged that the studs on one roller will mesh with the cross-shaped recesses on the other as the rollers turn toward each other. The upper ends of these rollers are also provided with journals 59, which have a bearing in the blocks 60, mounted in the slots 61 in the end piece 38 of the frame 39.

62 63 represent levers fulcrumed in said end pieces, the upper angular arms of said levers resting against the opposite outside faces of the bearing-blocks, while their lower parallel arms are separated by a spiral spring 64 to hold the contiguous faces of each pair of rollers in contact and at the same time permit them to separate, as occasion requires, to permit the passage of pieces of stalk and shanks of ears without interfering with the gearing at their lower ends.

Figure 11:
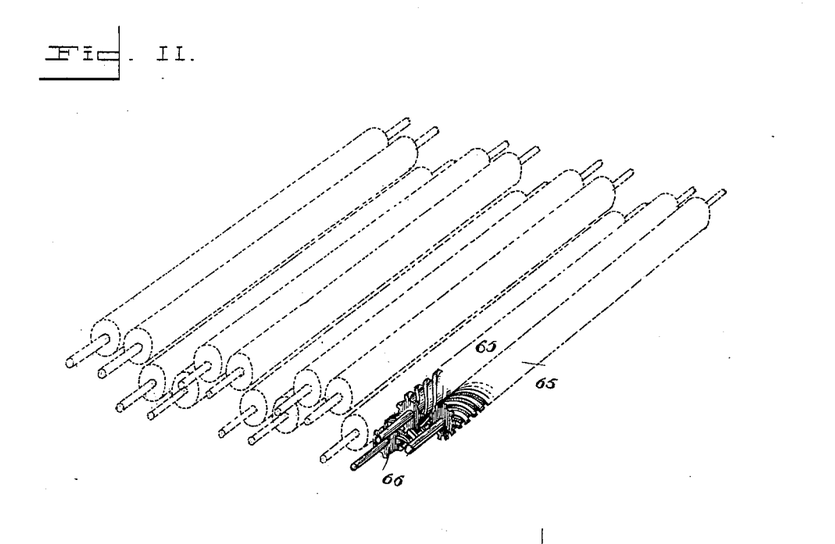
Fig. 11 is a detail view of the arrangement of the series of snapping-rollers.
Figure 12:
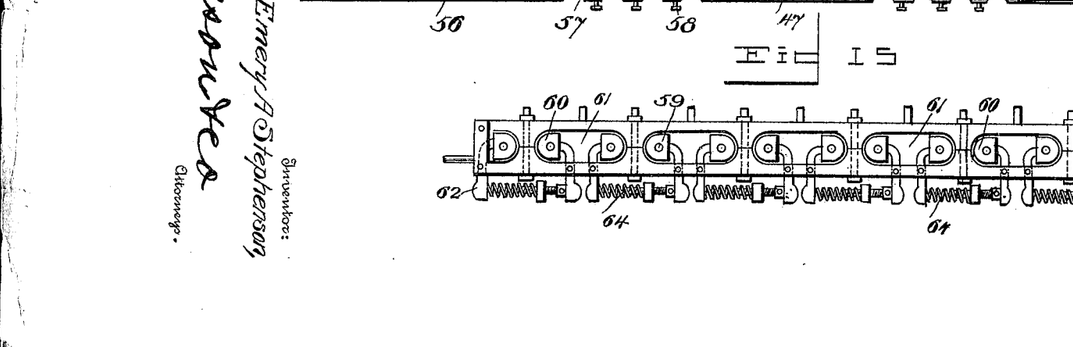
Fig. 12 is a similar view of part of a single pair of said snapping-rollers.

65 66 denote snapping-rollers arranged at an inclination to and above the upper end of the husking-rollers, and they are spirally threaded or corrugated in opposite directions, as shown in Fig. 11, the corrugations being arranged to snap the ears from the stalk. The lower ends of these rollers are journaled in a cross-brace 67, and their upper ends are journaled in and extend through a similar brace 68, where their outer ends are provided with grooved pulleys 69, to which the proper motion is communicated by the endless belts 70, driven by the drum 71 on the transverse shaft 72, one end of which carries a small pulley 73 and the other a large pulley 74. These snapping-rollers 65 66 are arranged in two planes, as shown in Fig. 11, a pair in the lower section being arranged beneath the space between each pair of rollers in the upper section. Immediately above the upper ends of each pair of the rollers in the upper section is mounted a fluted feed-roller 75, fixed on a shaft 76 and rotated by a pulley 77, the object of these feed-rollers being to catch the fodder that comes to the upper end of the snapping-rolls and force it in between them.

Figure 1:
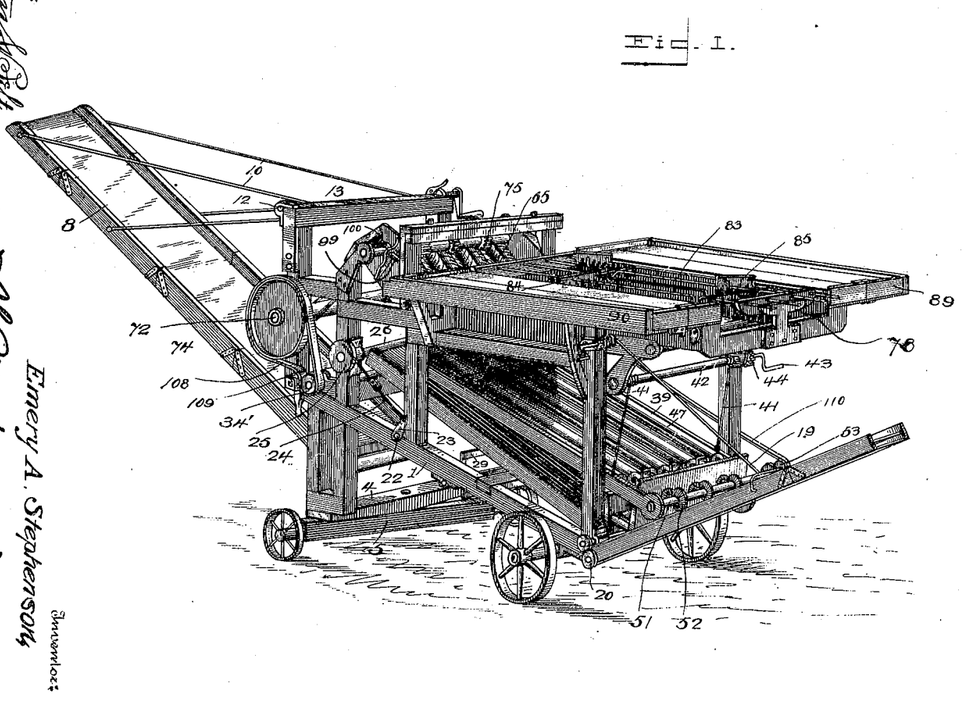
Figure 1 is a general perspective view of my improved combined self-feeding corn-husker and fodder-shredder.
Figure 2:
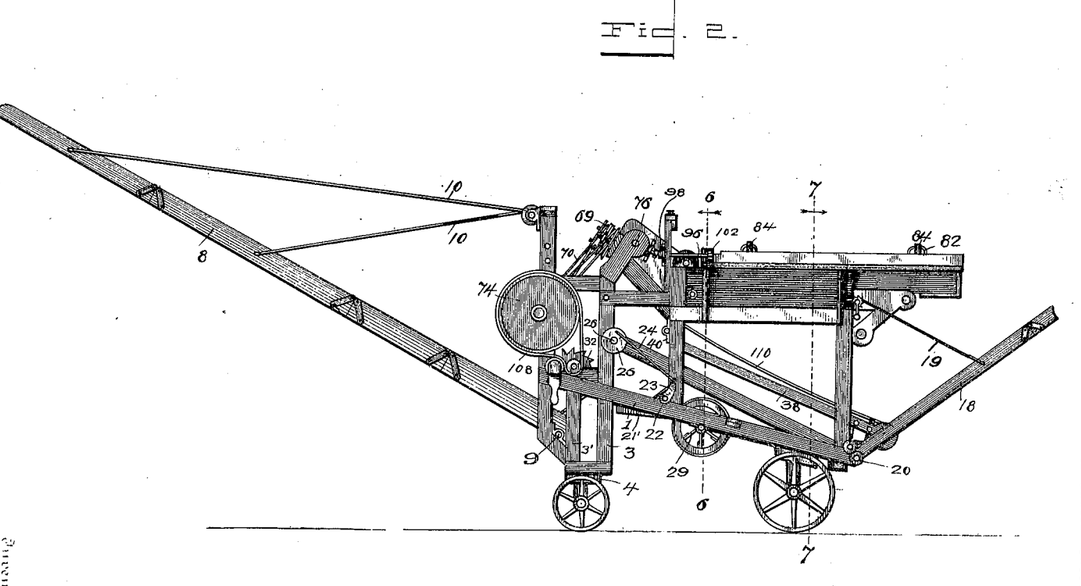
Fig. 2 is a side elevation taken from one side of the machine.
Figure 3:
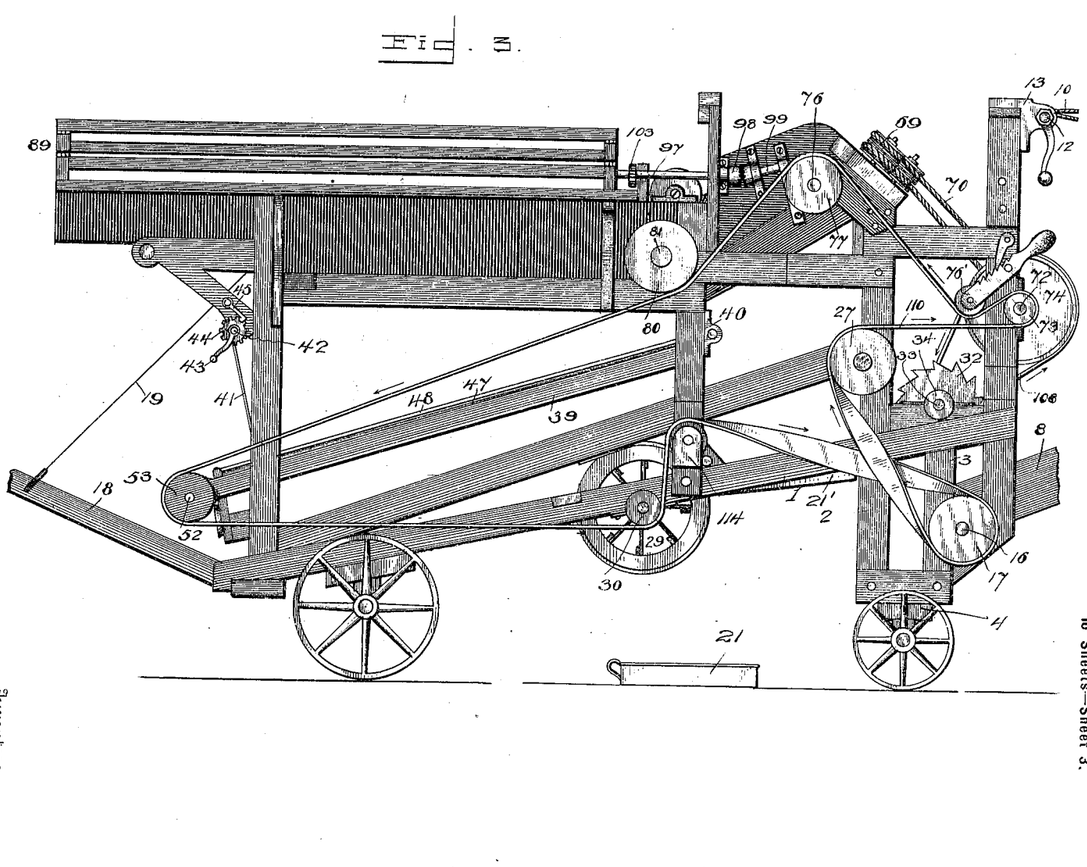
Fig. 3 is a similar view taken from the opposite side of the machine.
Figure 4:
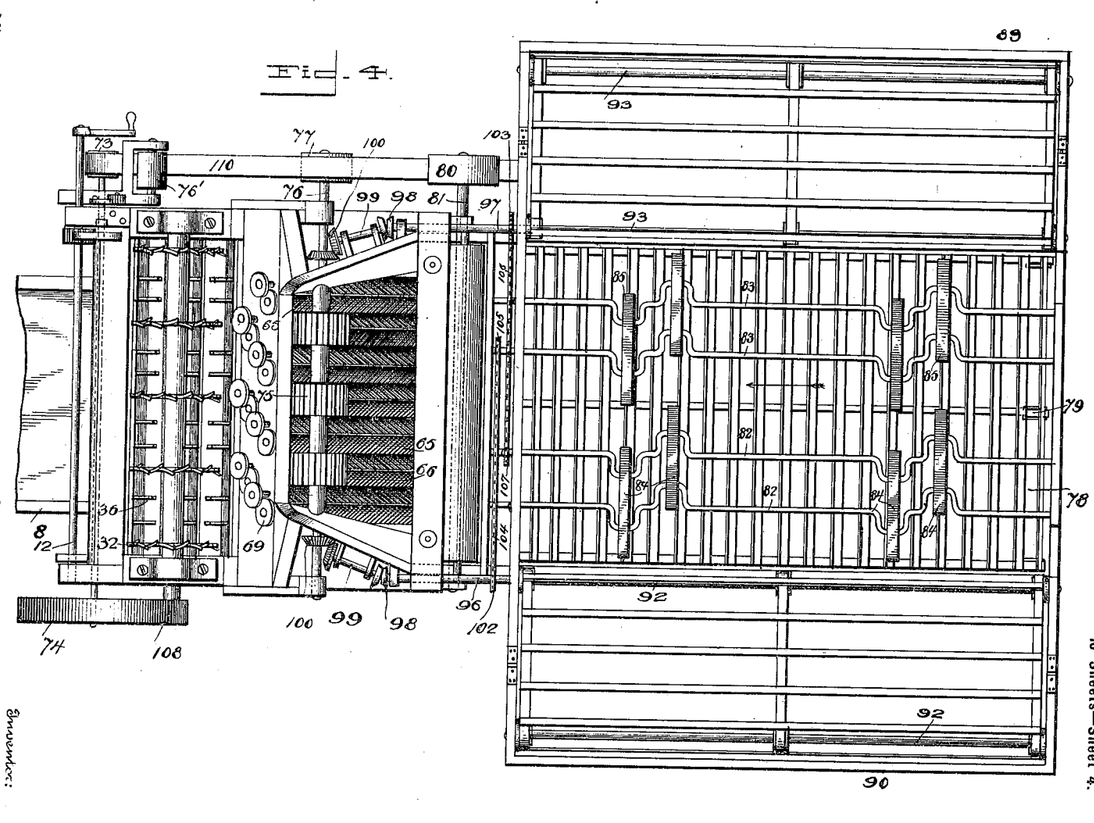
Fig. 4 is a top plan view.
Figure 5:
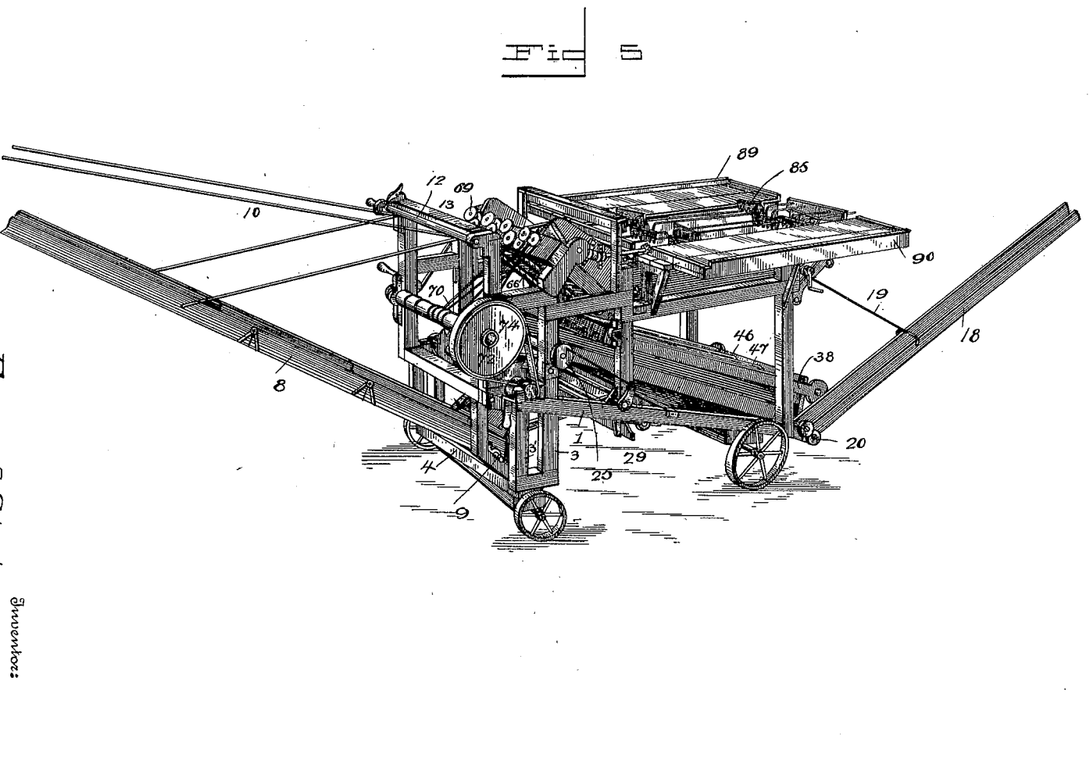
Fig. 5 is a perspective view looking into the front end of the machine.
Figure 6:
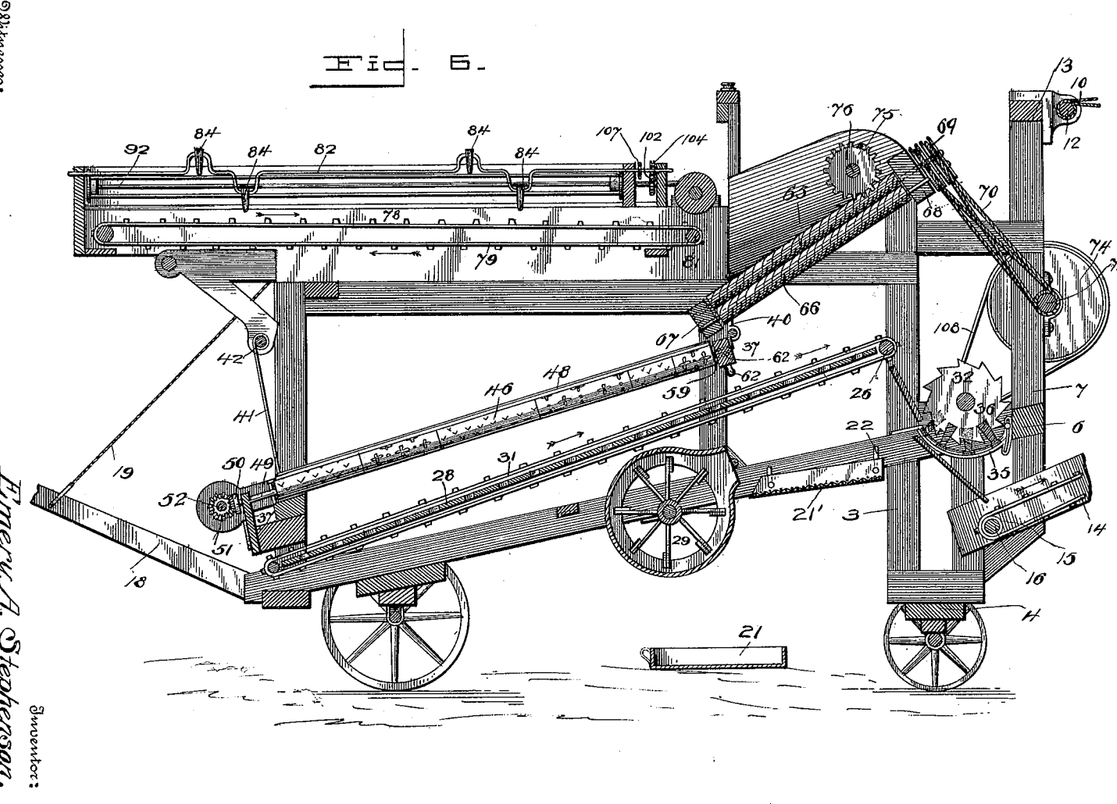
Fig. 6 is a longitudinal section.
Figure 7:
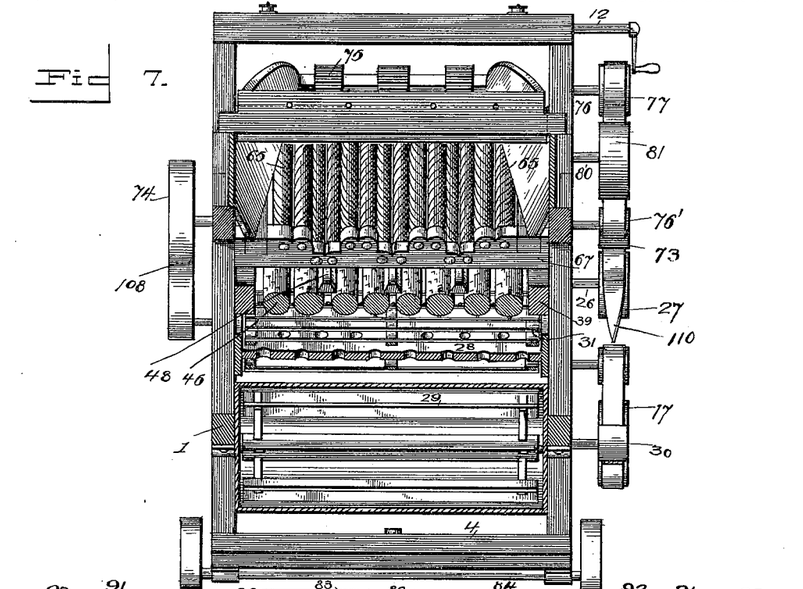
Fig. 7 is a transverse section on the line 6 6 of Fig. 2.
Figure 13:
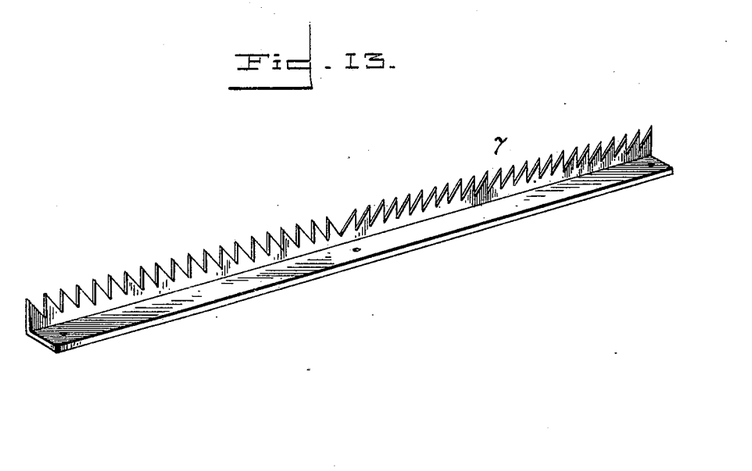
Fig. 13 is a detail view of one of the slats on the hopper-conveyer 79.

The feeder consists of a central hopper 78, the bottom of which consists of an endless slatted carrier or conveyer-belt 79, moving in the direction of the arrow shown in Fig. 4, and it is driven by a pulley 80 on the shaft 81. The upper faces of the slats on the conveyer-belt 79 are provided with a series of oppositely-disposed rake-teeth 79', as is more clearly shown in Fig. 13.

82 82 and 83 83 denote longitudinal parallel double crank-shafts mounted above the conveyer 79, and the cranks of the shafts 82 82 carry the parallel bars 84 84; while the cranks of shafts 83 83 carry corresponding bars 85 85. The lower faces of these bars are provided with oppositely-projecting rake-teeth 86 87.

89 90 denote the side tables, which are hinged to the sides of the hopper, so as to fold inwardly when not in use. Each of these tables is provided with a slatted conveyer 91, which is driven by the shafts 92 93, so as to carry the corn inwardly from each table onto the conveyer-belt 79. These lateral conveyers 94 95 are operated by the longitudinal shafts 96 97, the forward ends of which are provided with universal couplings 98 98, which connect with the counter-shafts 99 99, the forward ends of which are provided with the bevel-gears 100 100, which mesh with corresponding bevel-gears 101 101, fixed on the shaft 76. The shafts 96 97 are also provided with sprocket-wheels 102 103, a sprocket-chain 104, extending from the sprocket-wheel 102 to a similar sprocket-wheel 105 on the crank-shaft 83, and a similar sprocket-chain 106 extends from the sprocket-wheel 103 to a corresponding sprocket-wheel 107 on the crank-shaft 82 to impart the proper movement to the rake-bars.

Figure 14:
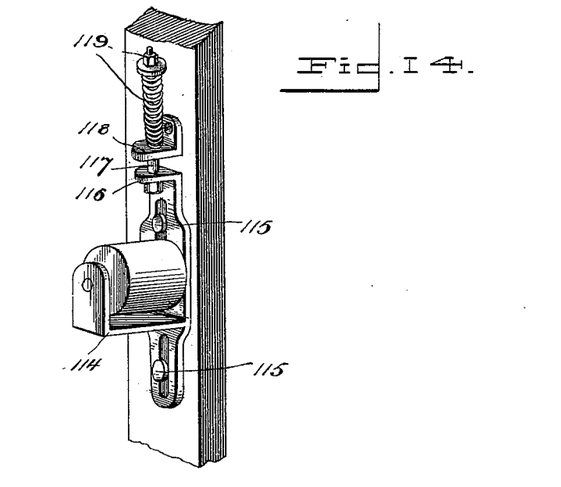
Fig. 14 is an enlarged detail perspective view of the automatic belt-tightener 112.

The machine is driven by a belt (not shown) on the pulley 34, fixed on one end of the shredder-shaft 33, and the opposite end of this shaft carries the pulley 34', from which a belt 108, passing across the path of the adjustable idler 109, encompasses the pulley 74 on the shaft 72, and the opposite end of said shaft 72 carries a pulley 73, from which a belt 110 passes under an adjustable idler 76', thence over the pulley 77 on the feed-roller shaft 76, thence under the pulley 80 on the conveyer-shaft 81, thence around the pulley 53 on the husking-roller-operating shaft 52, thence under the pulley 30 on the fan-shaft, thence upward and over the automatic belt-tightener 114, thence down and around the pulley 17 on the husk-conveyer shaft 16, thence crossing itself it passes over the pulley 27 on the husk-conveyer shaft and back to the starting-point pulley 34. The automatic belt-tightener 114, referred to above and shown in Fig. 14, consists of a bracket in which a band-pulley is mounted in the path of the driving-belt, and it is provided with alined slots to receive the bolts 115, which adjustably secure it to the frame. Its upper end is formed with a lateral lug 116 to receive the headed end of a tension-roll 117, which extends through a fixed guide-bracket 118, its outer end being provided with a washer and nut to retain the tension-spring 119 in place, the expansive tendency of which is exerted to keep the belt 110 at a proper tension to perform its work.

The operation is as follows: The stalks or fodder is thrown on the side tables, whence it is carried by the conveyers 9 and 91 and delivered into the hopper 48 and falls upon the rake-teeth 79' on the conveyer 79, and the rake-teeth 86 and 87, carried by the crank-shafts 82 83, evenly distribute the fodder over the conveyer 79. The fodder is now carried forward and is forced into and passes between the snapping-rollers and into the shredder-saws and is discharged on the fodder-carrier 8 and carried to the mow. When the fodder passes between the snapping-rollers, the ears are snapped off, as the rollers will not permit the ears to pass between them, and the ears now pass on to the husking-rollers, where the husk is removed, together with a small per cent. of the grain, which is incidentally detached by said rollers and, together with the husks, passes between said husking-rollers and falls on the shuck-carrier, the husks being carried to the shredder-saws and thence to the mow, the same as the fodder first mentioned, while the loose grains pass through the shuck-carrier to the riddle and across the path of the blast from the fan to separate the chaff and refuse matter, and from the riddle the clean grain is discharged into the receptacle placed beneath to receive it. The ears in the meantime, after the husk has been removed, slide by gravity down the husking-rollers and fall on the transverse conveyer 13, where they are delivered to the lower end of the conveyer 18, which in turn discharges them into the wagon.

Having thus fully described my invention, what I claim as new and useful, and desire to secure by Letters Patent of the United States, is—

1. In a corn-husker and shredder, the combination with the longitudinal conveyer-belt 79, of a double series of snapping-rollers 65 66 arranged in different parallel planes, and in a diagonal plane to said longitudinal conveyer-belt and a parallel series of husking-rolls 46 47 mounted beneath said snapping-rollers, substantially as and for the purpose set forth.

2. In a corn-husker and shredder, the combination with the longitudinal conveyer-belt 79, and the snapping-rollers 65 and 66, of the fluted feed-roller 75 mounted horizontally across and above said snapping-rollers and the husking-rolls 46 47 arranged beneath said snapping-rollers, substantially as and for the purpose set forth.

In testimony whereof I have hereunto set my hand in presence of two subscribing witnesses.

EMERY A. STEPHENSON.

Witnesses:
   SAMUEL R. ARTMAN,
   JOHN C. PERKINS.